(12) United States Patent
Koyama et al.

(10) Patent No.: US 6,293,895 B1
(45) Date of Patent: Sep. 25, 2001

(54) TRANSFER ROLLER

(75) Inventors: Tatsuya Koyama; Hirokazu Ando; Satoru Furuya, all of Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/291,995

(22) Filed: Apr. 15, 1999

(30) Foreign Application Priority Data

Apr. 20, 1998 (JP) .................................................. 10-108857

(51) Int. Cl.$^7$ ...................................................... F16C 13/00
(52) U.S. Cl. .............................................. 492/56; 399/176
(58) Field of Search ................................. 492/56, 59, 18, 492/52; 399/174, 176, 115, 222, 313

(56) References Cited

U.S. PATENT DOCUMENTS

| | | | | |
|---|---|---|---|---|
| 2,088,470 | * | 7/1937 | Freedlander | 492/56 |
| 2,088,471 | * | 7/1937 | Freedlander | 492/56 |
| 3,673,025 | * | 6/1972 | Fukuyama et al. | 492/56 |
| 3,686,731 | * | 8/1972 | Koori et al. | 492/56 |
| 4,522,866 | * | 6/1985 | Nishikawa et al. . | |
| 5,089,851 | * | 2/1992 | Tanaka et al. | 399/176 |
| 5,235,386 | * | 8/1993 | Yano et al. | 399/176 |
| 5,312,662 | * | 5/1994 | Ohta et al. . | |
| 5,367,367 | * | 11/1994 | Ikeda et al. | 399/281 |
| 5,477,006 | * | 12/1995 | Imamiya et al. | 399/285 |
| 5,544,584 | * | 8/1996 | Thompson et al. | 101/401.1 |
| 5,819,646 | * | 10/1998 | Fukunaga | 100/176 |
| 5,822,658 | * | 10/1998 | Tanaka et al. | 399/174 |
| 5,827,160 | * | 10/1998 | Ohki et al. | 492/56 |
| 5,849,399 | * | 12/1998 | Law et al. | 428/212 |
| 5,860,360 | * | 1/1999 | Lane, III et al. | 101/376 |
| 5,918,098 | * | 6/1999 | Bennekom | 399/333 |
| 5,960,245 | * | 9/1999 | Chen et al. | 399/333 |

* cited by examiner

*Primary Examiner*—P. W. Echols
*Assistant Examiner*—Marc W. Butler
(74) *Attorney, Agent, or Firm*—Rabin & Berdo, P.C.

(57) ABSTRACT

A transfer roller is used in an electrophotographic printer. The transfer roller rotates in contact with a rotating photoconductive drum with a print medium travelling therebetween. The transfer roller has a metal shaft around which a rubber roller is formed. The rubber roller is sponge-like and electrically semiconductive. The rubber roller is covered with a resin tube which has a lower layer formed on the rubber roller and an upper layer formed on the lower layer. One of the upper and lower layers has a higher sealing effect than the other of the upper and lower layers, and the other of the upper and lower layers has a higher stability of electrical resistance than the one of the upper and lower layer.

6 Claims, 5 Drawing Sheets

TRANSFER ROLLER

BACKGROUND OF THE INVENTION

1. Field of the Invention

The present invention relates to a transfer roller.

2. Description of the Related Art

With conventional electrophotographic printers, a charging device uniformly charges the surface of a photoconductive drum and then an LED head illuminates the charged surface to form an electrostatic latent image. The electrostatic latent is developed by a developing device into a toner image. Then, the toner image is transferred by a transfer device to a print medium. A fixing device subsequently fixes the toner image on the print medium.

FIG. 7 is a perspective view of a transfer device of a conventional electrophotographic printer.

A transfer roller 11 is in pressure contact with a photoconductive drum 12. The transfer roller 11 rotates in a direction shown by arrow A and the photoconductive drum 12 rotates in a direction shown by arrow B. The transfer roller 11 receives a transfer voltage or positive high voltage +E. The photoconductive drum 12 carries a toner image 13 formed thereon. When a print medium 14 passes between the transfer roller 11 and the photoconductive drum 12, a transfer current flows from the transfer roller 11 to the photoconductive drum 12, thereby causing the toner image 13 to be deposited on the print medium 14.

The transfer roller 11 has a uniform surface resistance, so that a uniform transfer current flows through any areas in contact with the photoconductive drum 12. The transfer roller 11 is urged by a constant pressure F against the photoconductive drum 12, thereby creating an appropriate longitudinal contact area between the transfer roller 11 and the photoconductive drum 12. This ensures that the print medium 14 travels straightforwardly in a direction shown by arrow C as the transfer roller 11 and the photoconductive drum 12 rotate.

The transfer roller 11 includes a metal shaft with a rubber material deposited thereon. The rubber material is formed by kneading, for example, a semiconductive urethane rubber, silicone rubber, or the like. The rubber material is foamed, vulcanized into a sponge-like material by adding a vulcanizing agent, and finally formed into a specific shape and dimensions. An electrically conductive material is added to the rubber material, thereby making the rubber material electrically semiconductive.

The conventional transfer roller 11 suffers from the following problems. Some rubber materials react with the material of the photoconductive drum 12 when they are left in an environment of high temperature and high humidity for a long time, so that the rubber material welds with the photoconductive drum, or the vulcanizing agent, semiconductive material, or the like is deposited to the photoconductive drum. As a result, the photoconductive drum is contaminated, causing lines to appear in the printed image. This decreases the print quality.

In order to solve this problem, the length of time during which vulcanization is performed is extended so that less vulcanizing agent is added to the rubber material, or the surface of the transfer roller 11 is coated with an inert material. However, such treatments not only are insufficient in preventing drum contamination but also lose some degrees of freedom in designing the characteristics of transfer roller 11 such as electrical resistance and mechanical hardness.

SUMMARY OF THE INVENTION

The present invention was made to solve the aforementioned problems of the conventional transfer rollers.

An object of the invention is to provide a transfer roller which prevents drum contamination so as to maintain the quality of printed images.

Another object of the invention is to provide a transfer roller, which still maintains the degrees of freedom in designing the characteristics of the transfer roller.

A transfer roller is used in an electrophotographic printer. The transfer roller rotates in contact with a rotating photoconductive drum with a print medium travelling therebetween. The transfer roller has a metal shaft around which a rubber roller is formed. The rubber roller is sponge-like and electrically semiconductive. The rubber roller is covered with a resin tube which has a lower layer formed on the rubber roller and an upper layer formed on the lower layer. One of the upper and lower layers has a higher sealing effect than the other of the upper and lower layers, and the other of the upper and lower layers has a higher stability of electrical resistance than the one of the upper and lower layer.

An organic ion electrically conductive material is added to the upper layer for stable electrical resistance while carbon black is added to the lower layer for increased sealing effect.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE INVENTION

Preferred embodiments of the present invention will be described in detail with reference to the accompanying drawings.

First Embodiment

Figure 1:
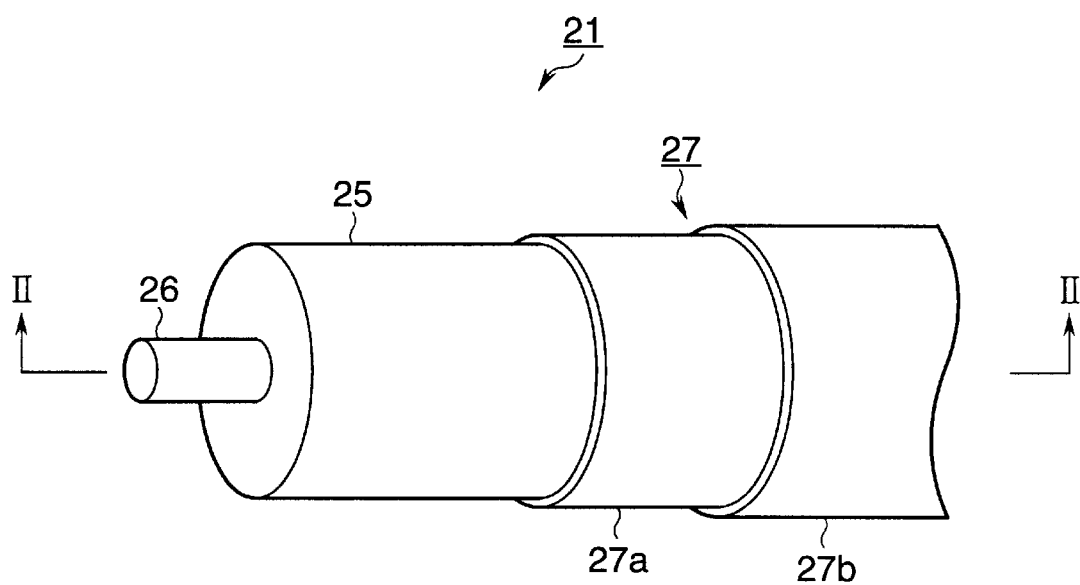
FIG. 1 is a fragmentary perspective view of a transfer roller according to a first embodiment.

FIG. 1 is a fragmentary perspective view of a transfer roller according to a first embodiment.

Figure 2:
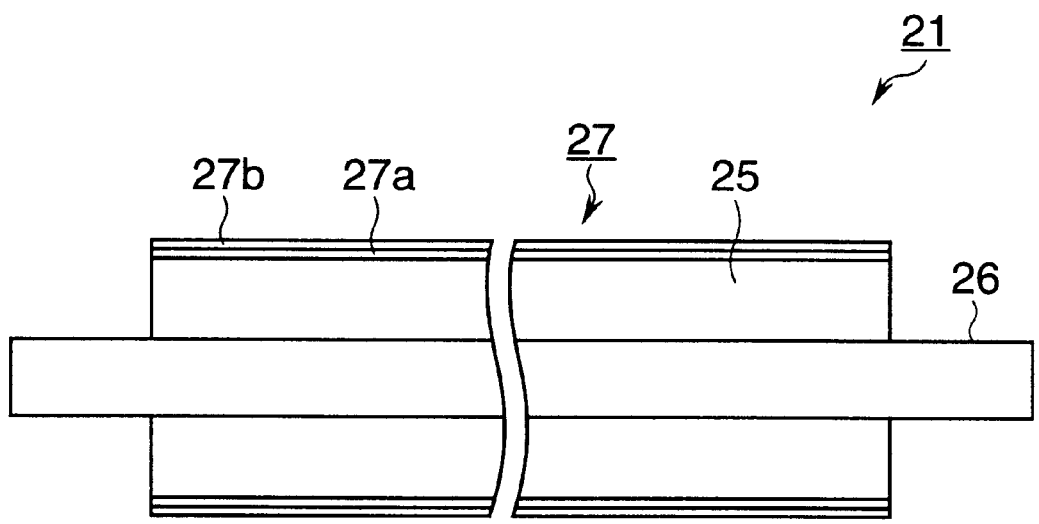
FIG. 2 is a longitudinal cross-sectional view taken along lines III—III of FIG. 1.

FIG. 2 is a longitudinal cross-sectional view taken along lines II—II of FIG. 1.

Figure 3:
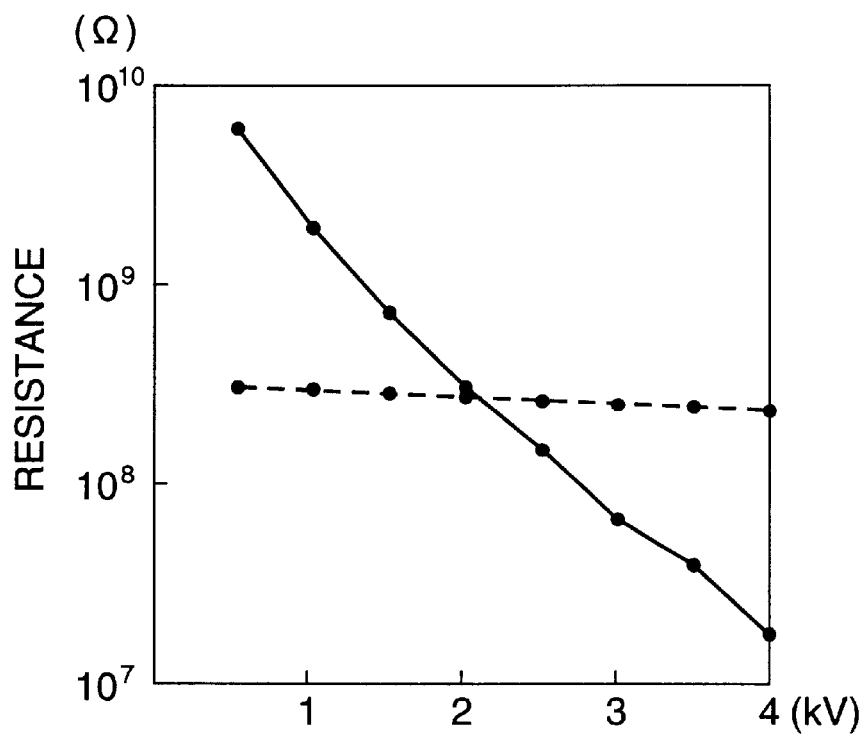
FIGS. 3 and 4 show characteristics of a resin tube 27 of FIG. 1.
Figure 4:
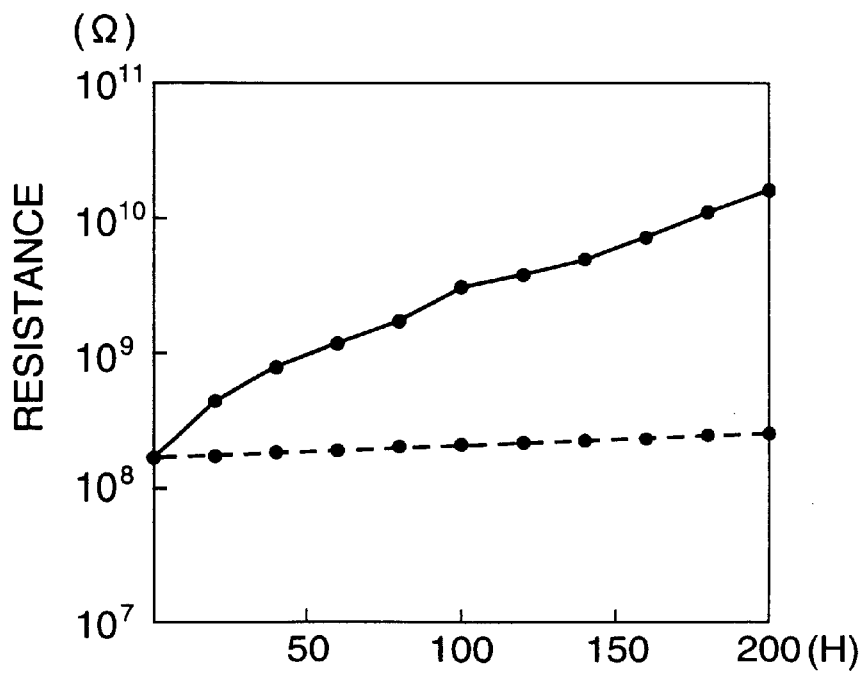

FIGS. 3 and 4 show characteristics of a resin tube 27 of FIG. 1.

FIG. 3 plots the voltage applied to a transfer roller 21 as abscissa and the resistance of the resin tube 27 as ordinate.

FIG. 4 plots the time for which the transfer voltage is applied to the transfer roller 21 as abscissa and the resistance of the resin tube 27 as ordinate.

In FIGS. 3 and 4, the solid lines indicate the characteristics of the transfer roller 21 when carbon black is added as an electrically conductive material and the dotted lines represent the characteristics of the transfer roller 21 when an organic ion electrically conductive material is added.

Referring to FIGS. 1 and 2, the transfer roller 21 includes a metal shaft 26, a sponge-like electrically semiconductive rubber roller 25 formed around the shaft 26, and an electrically semiconductive resin tube 27 formed on the rubber roller 25. The resin tube 27 is of a dual-layer structure having a lower layer 27a formed directly on the rubber roller 25 and an upper layer 27b formed on the lower layer 27a. The upper and lower layers 27b and 27a are formed in an integral construction by simultaneously extruding the resin materials through the extruding die of an extruding machine, not shown. The resin tube 27 is formed in the shape of a tube and fitted over the rubber roller 25. Then, the resin tube 27 is subjected to heat treatment for shrinkage. A layer of an adhesive, not shown, is applied to the surface of the rubber roller 25.

The lower layer 27a is made of a matrix of fluororesin. A material such as carbon black is added as an electrically conductive material to the matrix. The upper layer 27b is made of a matrix of fluororesin. An organic ion electrically conductive material such as materials containing, for example, lithium therein is added to the matrix.

Since rubber is not used as a matrix, the matrix will not react with the material of the photoconductive drum 12 to weld together even if the transfer roller 21 is left for a long time in an environment of high temperature and high humidity.

Fluororesin as a matrix is an excellent binder for the vulcanizing agent and electrically conductive material. Thus, there is no possibility of the vulcanizing agent, electrically conductive material, and the like seeping out of the resin tube 27 and being deposited on the photoconductive drum 12. Thus, the photoconductive drum 12 is not contaminated.

As shown in FIG. 3, if carbon black is added to the matrix, the electrical resistance of the resin tube 27 decreases with increasing applied voltage. If the organic ion electrically conductive material is added, the electrical resistance of the resin tube 27 will not change significantly when the voltage applied changes.

As shown in FIG. 4, adding carbon black causes the electrical resistance of the resin tube 27 to increase with increasing accumulated time of application of high voltage. Adding an organic ion electrically conductive causes little or no changes in resistance with increasing accumulated time of application of high voltage. Adding carbon black minimizes changes in the resistance of the resin tube 27 resulting from changes in environmental conditions such as temperature and humidity change. Adding an organic ion electrically conductive material causes changes in the electrical resistance of the resin tube 27 as the environmental conditions change.

Adding carbon black increases the density of the resin, more effectively sealing low-molecular materials such as vulcanizing agent added to the rubber roller 25. Adding organic ion electrically conductive material cannot increase the density of the resin and is therefore less effective in sealing low-molecular materials such vulcanizing agents added to the rubber roller 25.

Adding only carbon black to the resin tube 27 increases the sealing effect and prevents the low-molecular materials such as vulcanizing materials added to the rubber roller 25 from passing through the resin tube 27. Therefore, drum contamination is sufficiently suppressed. However, when only carbon black is added to the resin tube 27, if the accumulated time of application of high voltage (transfer voltage) increases, the resistance of the resin tube 27 increases with increasing the accumulated time of application of high voltage. This shortens the lifetime of the transfer roller 21.

When an organic ion electrically conductive material alone is added to the resin tube 27, the resistance of the resin tube 27 is stabilized, not changing significantly even if the accumulated time of application of high voltage. Accordingly, the overall resistance of the transfer roller 21 will not change so that the lifetime of the transfer roller 21 is prolonged. However, adding only an organic ion electrically conductive material to the resin tube 27 provides a lower sealing effect and cannot prevent the low-molecular material added to the rubber roller 25 from passing through the resin tube 27. This causes drum contamination. Therefore, the resin tube 27 needs to be thick, impairing the characteristics such as flexibility of the rubber roller 25.

In the present embodiment, carbon black that carries electrons is added to the lower layer 27a to increase the sealing effect and prevent low-molecular material, such as vulcanizing agent added to the rubber roller 25, from penetrating through the resin tube 27. Further, an organic ion electrically conductive material is added to the upper layer 27b for increased stability of the electrical resistance of the resin tube 27, thereby prolonging the life of the transfer roller 21.

In the present embodiment, the materials for the upper and lower layers 27b and 27a are prepared such that the resin tube 27 has, for example, uniform electrical resistance and uniform thickness. The electrical resistance, thickness, and other characteristics of the resin tube 27 can be selected arbitrarily. Thus, these characteristics can be determined independently of each other. Although the lower layer 27a is integrally continuous with the upper layer 27b, the upper and lower layers 27b and 27a may be formed independently and placed one over the other when actually forming them on the rubber roller 25.

As mentioned above, upper and lower layers 27b and 27a that have different properties are formed on the rubber roller 25. The layers 27a and 27b increases the sealing effect, so that the low-molecular material such as vulcanizing agent added to the rubber roller 25 will not penetrate through the resin tube 27. Thus, drum contamination can be sufficiently prevented and print quality is improved.

The organic ion electrically conductive material added to the upper layer 27b maintains the same overall electrical resistance of the transfer roller 21 under different printing conditions. Thus, the life of the transfer roller 21 is prolonged.

The fluororesin added to the upper and lower layers 27b and 27a protects the surface of the rubber roller 25. Thus, the transfer roller 21 withstands repeated use without being deteriorated.

The materials used for the upper and lower layers may be interchanged. In other words, the organic ion electrically conductive material can be added to the lower layer 27a to increase stability of electrical resistance and the carbon black maybe added to the upper layer 27b to increase sealing effect.

Second Embodiment

Elements of the same construction as those of the first embodiment have been given the same reference numerals.

Figure 5:
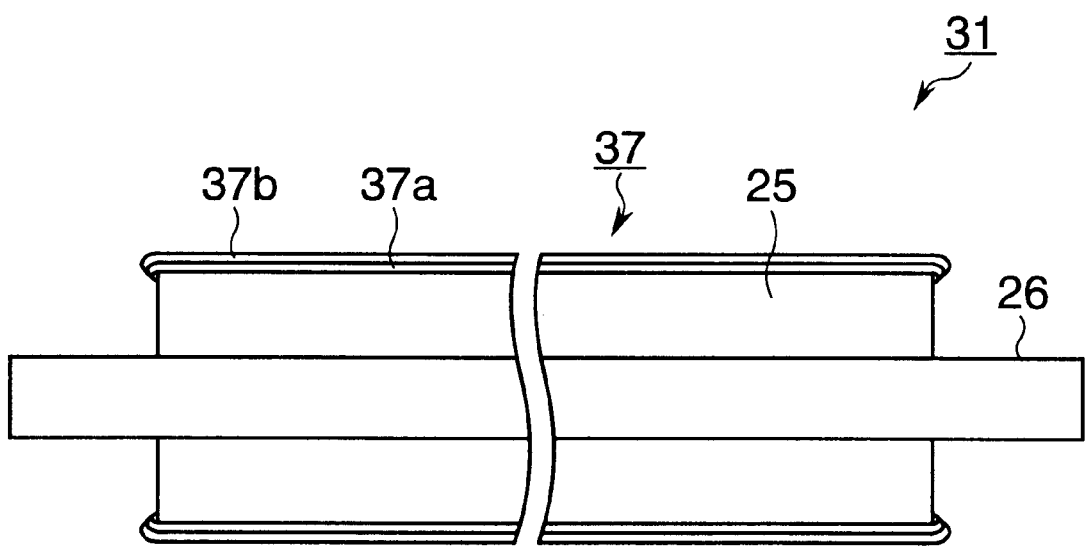
FIG. 5 is a longitudinal cross-sectional view of a transfer roller according to a second embodiment.

FIG. 5 is a longitudinal cross-sectional view of a transfer roller according to a second embodiment.

Figure 6:
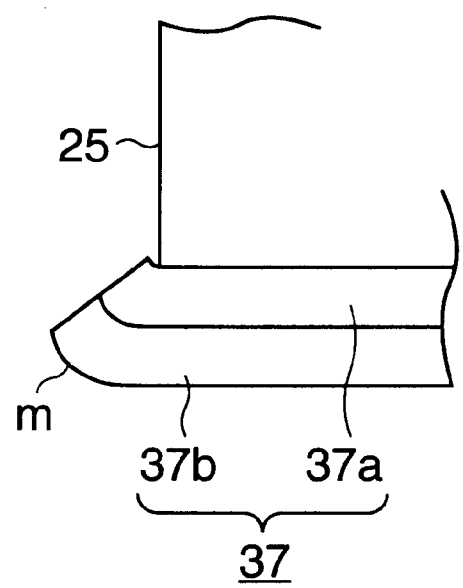
FIG. 6 is an enlarged view of the transfer roller of FIG. 5.
Figure 7:
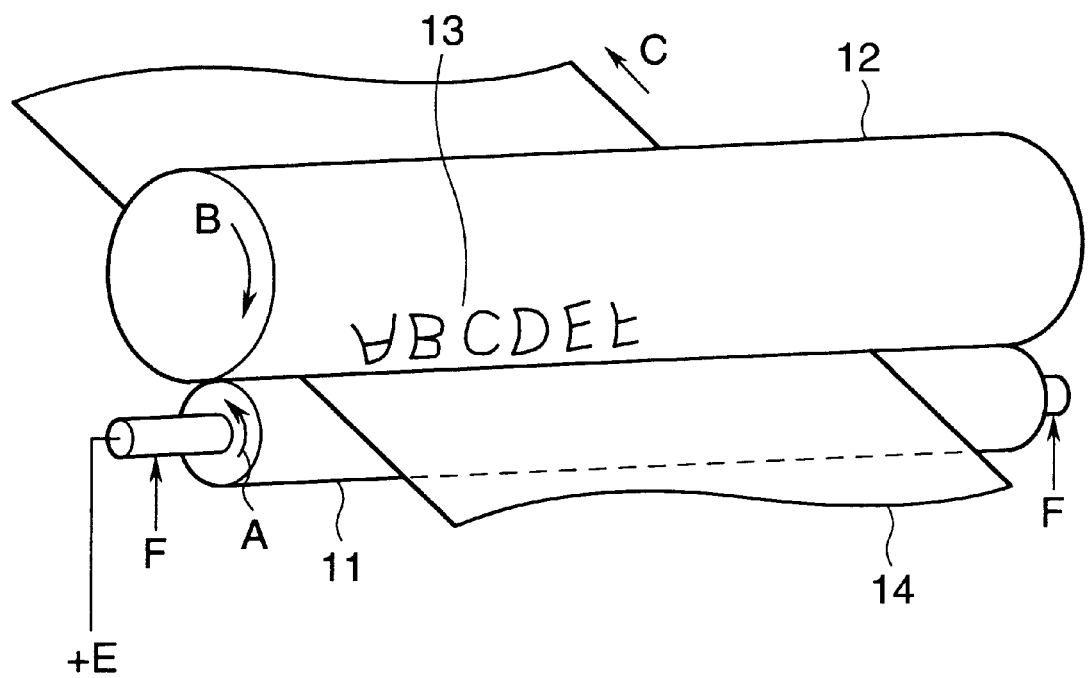
FIG. 7 is a perspective view of a transfer device of a conventional electrophotographic printer.

FIG. 6 is an enlarged fragmentary view of the transfer roller of FIG. 5.

Referring to FIGS. 5 and 6, a semiconductive resin tube 37 is formed on the rubber roller 25. The resin tube 37 is of a dual-layer structure having a lower layer 37a formed directly on the rubber roller 25 and an upper layer 37b formed on the lower layer 37a. The resin tube 37 is slightly longer than the rubber roller 25. When the resin tube 37 formed on the rubber roller 25 is subjected to heat shrinkage, the resin tube 37 extending beyond the longitudinal ends of the rubber roller 25 shrinks to wrap around the longitudinal end corners of the rubber roller 25, leaving a round portion m (FIG. 6) around the longitudinal end corners of the rubber roller 25.

When the transfer roller 31 receives a transfer voltage, a portion (leak current) of the transfer current flows preferentially through the longitudinal ends of the transfer roller 31 where discharge is apt to occur between the photoconductive drum 12 and the transfer roller 31. As a result, less transfer current flows through the print medium 14 from the transfer roller 31 to the photoconductive drum 12. Thus, the ratio of the leak current (current not passing through the print medium but passing through the longitudinal ends) to the effective transfer current (current passing through the print medium) increases, decreasing the transfer efficiency at a given transfer voltage. Increasing the transfer voltage in an attempt to increase the transfer current will increase the chance of discharge occurring at the longitudinal ends of the transfer roller 31. For this reason, the transfer efficiency cannot be improved.

In order to prevent discharge from occurring, the transfer roller 31 may be chamfered at the longitudinal ends thereof. However, additional machining time is required, increasing the cost of the transfer roller 31.

In the second embodiment, the round portion m is formed to surround the longitudinal ends of the transfer roller 31, preventing discharge between the transfer roller and the photoconductive drum. The round portion m also prevents a portion of transfer current from flowing preferentially through the longitudinal ends of the transfer roller 31. As a result, a larger portion of the transfer current flows through the print medium between the transfer roller 31 and the photoconductive drum 12, increasing transfer efficiency. Forming the resin tube 37 on the rubber roller 25 and forming the round portion m can be carried out simultaneously without increasing overall machining time.

The diameter of the longitudinal ends of the resin tube 37 that extends beyond the longitudinal ends of the rubber roller 25 is smaller than that of the rubber roller 25. The difference in diameter prevents the resin tube 37 from sliding relative to the rubber roller 25 in a longitudinal direction when a force is exerted on the transfer roller 31. Less mechanical stress is encountered in printers with relatively low printing speed and printers that can accept only an A4 size print medium. For these printers, there is no need for applying an adhesive between the rubber roller 25 and the resin tube 27, thus further reducing the manufacturing cost of the transfer roller 31.

While the embodiments have been described with respect to the transfer rollers 21 and 31, the present invention can be applied to other rollers such as a charging roller and a developing roller, which are required to have similar properties. In the aforementioned embodiments, the resin tubes 27 and 37 are made of fluororesin. Alternatively, the resin tubes 27 may be formed of nylon (trade name) resin.

Example

The rubber roller 25 is in the form of an electrically semiconductive sponge and the resin tube 27 has a resistance of about $10^8$ Ω. The thickness of the resin tube 27 is about 100 μm. The lower layer 27a has a thickness of about 20 μm and the upper layer 27b has a thickness of about 80 μm. The resistance of the lower layer 27a is about ten times as high as that of the upper layer 27b. The resin tube 27 has substantially the same total resistance as the rubber roller 25. Thus, the total resistance of the transfer roller 21 is substantially the same before and after the resin tuber 27 is formed over the rubber roller 25.

If only carbon black as an electrically conductive material is added to the resin tube 27, the electrical resistance increases with increasing the accumulated time of application of high voltage, causing changes in the overall resistance of the transfer roller. Therefore, it is necessary to make the resistance of the resin tube 27 as stable as possible. The resistance changes widely if the volume resistivity ranges from $10^7$ to $10^{10}$ Ω·cm. Thus, the volume resistivity of the lower layer 27a is selected outside of the aforementioned range from $10^7$ to $10^{10}$ Ω·cm.

When the volume resistivity of the lower layer 27a is above the range of $10^7$–$10^{10}$ Ω·cm, the volume resistivity of the upper layer 27b is decreased to a value below the range of $10^7$–$10^{10}$ Ω·cm and the ratio of the thickness of the lower layer 27a to that of the upper layer 27b is selected such that the overall electrical resistance of the resin tube 27 is substantially the same as that of the rubber roller 25.

When the volume resistivity of the lower layer 27a is below the range of $10^7$–$10^{10}$ Ω·cm, the volume resistivity of the upper layer 27b is increased to a value above the range of $10^7$–$10^{10}$ Ω·cm and the ratio of the thickness of the lower layer 27a to that of the upper layer 27b is selected such that the overall electrical resistance of the resin tube 27 is substantially the same as that of the rubber roller 25.

Before the aforementioned resin is fitted over the rubber roller 25, the rubber roller 25 has been machined to desired dimensions and an adhesive has been applied to the surface of the rubber roller 25. After the resin tube has been fitted over the rubber roller 25, the resin tube 27 is heated to shrink-fit the rubber roller 25 and firmly bonded to the rubber roller 25. Thus, the shrinkage of the resin tube 27 and the adhesive prevent the resin tube 27 from sliding relative to the rubber roller 25 in the axial direction when a force is exerted on the transfer roller 21 during its rotation.

The upper and lower layers 27b and 27a of the resin tube 27 are formed of a fluororesin which is not oxidized even if discharge occurs repeatedly between the resin tube 27 and the photoconductive drum 12.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A transfer roller comprising:

a metal shaft;

a rubber roller formed around the shaft, said rubber roller being sponge-like and electrically conductive, and containing a low-molecular material; and a resin tube having a lower resin layer formed on said rubber roller and an upper resin layer formed on said lower resin layer;

wherein one of the upper resin layer and the lower resin layer has carbon black added thereto so as to increase a density of the one resin layer, thereby providing the one resin layer with a higher sealing effect than the other of the upper resin layer and the lower resin layer so that the low-molecular material is prevented from penetrating through the one resin layer, and the other of the upper resin layer and the lower resin layer has an organic ion electrically conductive material added thereto so as to provide the other resin layer with a higher stability of electrical resistance than the one of the upper resin layer and the lower resin layer.

2. The transfer roller according to claim 1, wherein the upper layer and the lower layer are formed in solid construction.

3. The transfer roller according to claim 1, wherein the upper layer and the lower layer are made of one of fluororesin and nylon resin.

4. The transfer roller according to claim 1, wherein the resin tube is longer in longitudinal length than said rubber roller, and has opposed longitudinal ends, the longitudinal ends having an inner diameter smaller than an outer diameter of said rubber roller.

5. A transfer roller for use in contact with a photoconductive body, comprising:

a metal shaft;

a rubber roller formed around the shaft, said rubber roller being sponge-like and electrically semiconductive, and containing a low-molecular material; and a resin tube having a lower resin layer formed on said rubber roller and an upper resin layer formed on said lower resin layer;

wherein one of the upper resin layer and the lower resin layer comprises carbon black which has a sealing effect so that the low-molecular material forming said rubber roller is prevented from passing through said resin tube to the photoconductive body, and the other of the upper resin layer and the lower resin layer includes an organic ion electrically conductive material which stabilizes an electrical resistance of said resin tube.

6. A transfer roller for use in contact with a photoconductive body, comprising:

a metal shaft;

a rubber roller formed around the shaft, said rubber roller being sponge-like and electrically semiconductive, and containing a low-molecular material; and a lower resin layer formed on said rubber roller and an upper resin layer formed on said lower resin layer;

wherein a first one of the upper resin layer and the lower resin layer comprises carbon black that increases a sealing effect so that the first one of the upper resin layer and the lower resin layer has a higher sealing effect against the low-molecular material forming said rubber roller than a second one of the upper resin layer and the lower resin layer; and the second one of the upper resin layer and the lower resin layer comprises an organic ion electrically conductive material that increases a stability of an electrical resistance so that the second one of the upper resin layer and the lower resin layer has a more stable electrical resistance over duration and value of a voltage applied thereto than the first one of the upper resin layer and the lower resin layer.

* * * * *